United States Patent [19]

Ingvarsson et al.

[11] Patent Number: 5,161,785
[45] Date of Patent: Nov. 10, 1992

[54] LEAF SPRING

[75] Inventors: Henrik Ingvarsson, Göteborg; Roland Svensson, Väröbacka, both of Sweden

[73] Assignee: AB Volvo, Göteborg, Sweden

[21] Appl. No.: 669,410

[22] PCT Filed: Sep. 20, 1989

[86] PCT No.: PCT/SE89/00509
§ 371 Date: Apr. 3, 1991
§ 102(e) Date: Apr. 3, 1991

[87] PCT Pub. No.: WO90/03281
PCT Pub. Date: Apr. 5, 1990

[30] Foreign Application Priority Data

Sep. 20, 1988 [SE] Sweden ................ 8803328

[51] Int. Cl.⁵ ............................................. B60G 11/04
[52] U.S. Cl. .............................................. 267/45; 267/46
[58] Field of Search ............ 267/36.1, 40, 45, 46, 267/47, 52

[56] References Cited

U.S. PATENT DOCUMENTS

| Re. 3,205 | 11/1868 | Buzzell | 267/36.1 |
|---|---|---|---|
| 433,308 | 7/1890 | Saladee | 267/45 |
| 1,135,036 | 4/1915 | McIntyre | 267/45 |
| 1,155,062 | 9/1915 | Heisler | 267/45 |
| 1,240,929 | 9/1917 | Bissell | 267/45 |
| 1,324,440 | 12/1919 | Ackerman | |
| 1,330,923 | 2/1920 | Utz | |
| 1,458,912 | 6/1923 | Draver | 267/46 |
| 1,583,003 | 5/1926 | Miller | 267/45 |
| 3,685,812 | 8/1972 | Buchesky et al. | |
| 3,891,197 | 6/1975 | Poulos | |

FOREIGN PATENT DOCUMENTS

| 61-75005 | 4/1986 | Japan . | |
| 2056015 | 3/1981 | United Kingdom | 267/47 |

Primary Examiner—Matthew C. Graham
Attorney, Agent, or Firm—Young & Thompson

[57] ABSTRACT

A leaf spring for the suspension of a rigid wheel axle (10) in an automotive vehicle, is pivotally but not laterally displaceably connected at a first end (15) thereof to the vehicle and is pivotally connected at a second end (16) thereof also to the vehicle. A center part (14) of the spring is connected rigidly to the wheel axle (10). The spring (6) between the first spring-end (15) and the center part (14) of the spring is straight or downwardly concave. The spring (6) between the center part (14) of the spring and the second end (16) of the spring has a double-curve configuration and, seen from the side, has a downwardly convex part (19) located nearest the center part (14) and a downwardly concave part (20) located nearest that second end (16) of the spring and adjoining the downwardly convex part (19).

4 Claims, 1 Drawing Sheet

LEAF SPRING

The present invention relates to a leaf spring for the suspension of a rigid wheel axle in automotive vehicles, said leaf spring being pivotally but non-displaceably connected at one end thereof to the frame of the vehicle or some like vehicle part and being pivotally connected at the other end thereof also to said frame and the center part of the spring being connected rigidly to said wheel axle.

Springs of this kind are used very widely as rigid wheel-axle suspensions, especially in heavy vehicles, such as lorries, trucks and like vehicles. In this case, one such spring is mounted at each end of the wheel axle, and as seen from the side, at which the load is exerted, the most common of these springs exhibits a convex shape over the major part of its length. When the spring is subjected to load, it will straighten out and increase in length. Because one end of the spring is connected non-displaceably to the frame of the vehicle, the other end of the spring will be displaced in its longitudinal direction, and consequently it is necessary to connect said other end in a manner which will permit such longitudinal displacement.

The aforesaid increase in length of the spring that takes place when the spring is subjected to load, will also result in linear displacement of the ends of the wheel axle fastened to the center of the spring when the load changes. When there is a difference in movement of the springs on both sides of the vehicle, such linear displacements of the axle will result in steering of the axle in its horizontal plane, which deleteriously affects the steering performance of the vehicle. Furthermore, the connection between said other ends of the springs and the vehicle frame which permits longitudinal movement of the spring creates problems with respect to friction and wear.

The object of the present invention is to overcome the aforesaid problems and to provide a leaf spring of the said kind which will enable the wheel axle to move through very small linear distances, which can be controlled by changing the shape of the spring, when the load on the spring changes and which will permit very small movements of the end of the spring connected to the vehicle frame for longitudinal movement. This object is achieved in accordance with the invention by means of a spring, in which, when no load is exerted thereon, that part of the spring which is located between the first spring end and the center part of the spring is straight or slightly curved, whereas that part of the spring which is located between the center part of the spring and the other end of the spring has a double-curve configuration and, seen from the side, where the load on the center part attacks, has a downwardly convex part nearest the center part and a downwardly concave part nearest the other end of the spring and adjoining the downwardly convex part.

The invention will now be described in more detail with reference to the accompanying drawing, in which FIG. 1 illustrates schematically a known leaf spring and shows the behavior of the spring under different loads;

Figure 1:
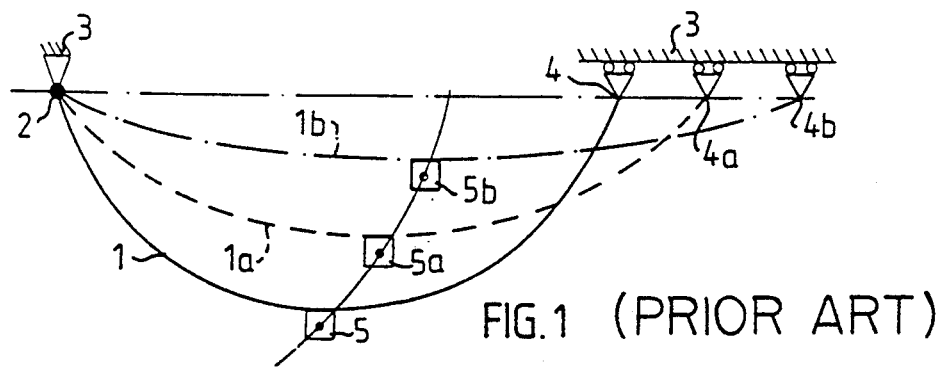

FIG. 1 illustrates a leaf spring of known kind, one end of which is connected at 2 to the schematically illustrated frame 3 of a vehicle in a manner which will permit pivotal movement of said one end, but not axial movement. The other end of the leaf spring 1 is connected to said frame 3 at a location 4 thereon, said connection being such as to permit said other spring end to pivot and also to move longitudinally. Firmly attached to the center part of the spring 1 is a schematically illustrated vehicle-wheel axle 5.

The full line in FIG. 1 illustrates the configuration of the spring 1 when no load is exerted thereon. When the spring is subjected to load, the shape of the spring changes successively, the configuration 1a shown in a broken line corresponding to an intermediate load and the configuration 1b shown in chain corresponding to a heavy load. The attachment 4 is rectilinearly displaceable and is normally the rear spring-attachment point in the vehicle and it will be seen from FIG. 1 that as the load on the spring increases, the attachment 4 will be displaced rearwards as the spring straightens out and will assume the positions 4a and 4b of the attachment 4 corresponding to the spring configurations 1a and 1b respectively. It will also be seen clearly from FIG. 1 that the wheel axle 5 is also moved linearly as the load on the spring changes. The axle positions marked 5a and 5b in FIG. 1 correspond to the spring configurations 1a and 1b respectively and the Figure shows that this linear displacement of the axle 5 is relatively large. As before mentioned, the steering performance of the vehicle is impaired when the springs at both ends of the wheel axle take different positions.

Figure 2:
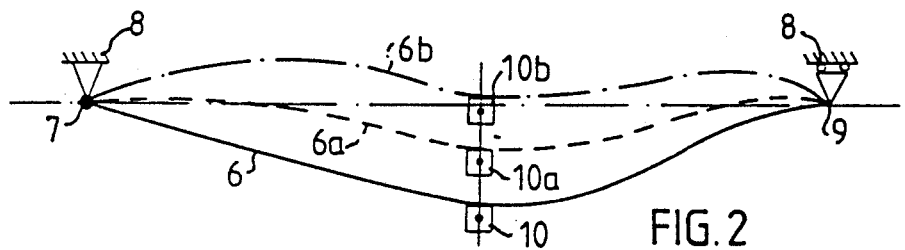
FIG. 2 illustrates schematically a spring configured in accordance with one embodiment of the invention.

FIG. 2 illustrates schematically the movement pattern followed by a leaf spring 6 configured in accordance with the invention. One end of the spring 6 is connected to an attachment 7 on a schematically illustrated vehicle frame 8, such as to permit said end to pivot, but not to move axially. The other end of the spring 6 is connected to an attachment 9 on said frame 8 in a manner which permits both pivotal and longitudinal movement of said other spring end, whereas the center part of the spring 6 has a wheel axle 10 securely connected thereto. Pivotal movement at the attachments 7 and 9 takes place around axial lines which extend substantially perpendicular to the longitudinal axis of the spring 6.

In FIG. 2, the full line shows the spring 6 in a relaxed state, i.e. with no load thereon, the broken line shows a spring configuration 6a and the axle position 10a when the spring is subjected to an intermediate load, and the chain line shows the configuration 6b of the spring 6 and the position of the axle 10b when the spring is subjected to a heavy load. Thus, as will be seen from FIG. 2, neither the spring attachment 9 nor the axle 10 are moved axially to any appreciable extent, which means that the steering performance of the vehicle will not be affected negatively when the load on the spring 6 changes.

Figure 3:
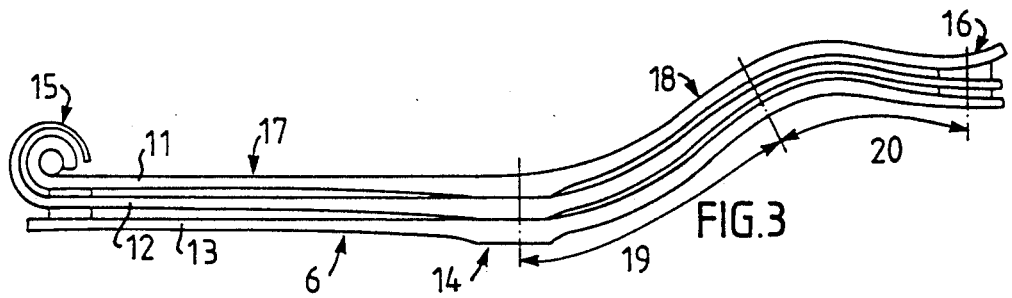
FIG. 3 is a side view of the leaf spring according to one embodiment of the invention and shows the spring in a relaxed state.

The movement pattern illustrated in FIG. 2 is achieved with a spring 6 configured in the manner illustrated in FIG. 3. The leaf spring illustrated in FIG. 3 comprises three leafs 11, 12 and 13, wherein the leaf 11 forms the main leaf of the spring. The spring leafs 11, 12 and 13 are joined together at their center parts 14, at which location the lower leaf 13 is provided with a mounting surface for the wheel axle 10. In this case, the spring leafs 12 and 13 are configured so as to extend parallel with the main spring-leaf 11. Naturally, the spring may be formed from a number of leafs other than three, for instance from a single leaf, two leafs or a greater number of leafs.

Figure 4:
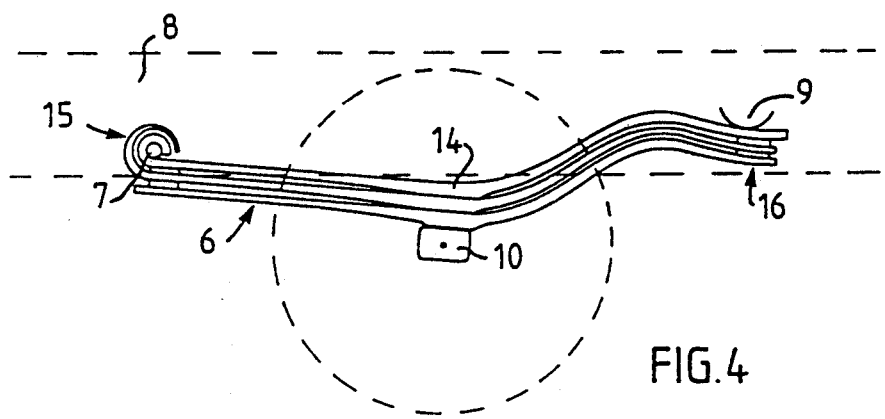
FIG. 4 is a side view of the leaf spring of FIG. 3 fitted to an automotive vehicle.

As will be seen from FIG. 4 in particular, the attachment 7 on which the first end 15 of the leaf spring 6 is mounted has the form of a pivot shaft which is mounted firmly on the vehicle frame 8 and around which the spring is able to pivot, but which prevents longitudinal movement of the first end 15 of said spring 6. It will also be seen from FIG. 4 that the frame-mounted attachment 9 on which the second end 16 of the spring is mounted comprises a mounting surface which is convex towards the spring 6, this surface permitting both pivotal and longitudinal movement of the spring.

For the purpose of obtaining the pattern of wheel-axle movement illustrated in FIG. 2, i.e. essentially vertical movement when the load on the spring changes, the spring 6 is configured in the manner illustrated in FIG. 3 and mounted in the manner illustrated in FIG. 4. The forward part 17 of the spring 6 located between the first end 15 and the central part 14 is substantially straight and directed upwards slightly from the central part 14 to the first spring-end 15. The rear part 18 of the spring 6 located between the central part 14 and the second spring-end 16 has, on the other hand, a double-curve shape. When seen from beneath in FIGS. 3 and 4, i.e. from the side on which the load exerted by the wheel axle 10 acts on the central spring-part 14, the rear part 18 of the spring 6 has a convex part 19 located nearest the central part 14 and a concave part 20 which is contiguous with the convex part and extends from said convex part up to or in the region of the attachment 9 for the second end 16 of the spring.

When a spring of this configuration is mounted on the vehicle-frame 8 in the manner illustrated in FIG. 4, movement of the wheel axle 10 will follow the pattern shown in FIG. 2. As the upward-load exerted by the wheel axle on the spring 6 increases, the front part 17 of the spring 6 will pivot about the attachment 7 and, at the same time, will be curved by the load exerted by the wheel axle 10, such as to shorten the distance between the attachment 7 and the wheel axle 10. The wheel axle 10 can be caused to move in the manner desired, by appropriate selection of the direction of the forward part 17 of the spring 6 in a relaxed state. At the same time, the configuration of the rear part 18 of the spring 6, including the convex part 19 and the concave part 20 means that the rear end 16 of the spring will move only very slightly, when the load on the spring 6 changes. In effect, when the load exerted by the wheel axle changes, the mean radius of the convex part 19 will increase while the mean radius of the concave part 20 decreases. Accordingly, by suitable dimensioning of the curved spring-parts 19 and 20, it is possible to restrict movement of the rear end 16 of the spring 6 to very small values or even to exclude the possibility of such movement all together.

When the forward part 17 of the spring 6 is given a slight concave configuration, as seen in the aforesaid direction, i.e. from beneath, the wheel axle can be caused to move slightly towards the attachment 7, when the load changes. In some cases this axle movement can be desirable for the purpose of influencing the steering properties of the vehicle.

As will be seen from FIGS. 3 and 4, the second end 16 of the spring 6, i.e. the end located adjacent the attachment 9, is configured with a convex part, as seen from beneath. This will enable the spring 6 to be adapted suitably to the attachment 9.

We claim:

1. A leaf spring for the suspension of a rigid wheel axle (10) in an automotive vehicle, said leaf spring (6) being pivotally but not laterally displaceably connected at a first end (15) thereof to the vehicle and being pivotally connected at a second end (16) thereof also to said vehicle and a center part (14) of the spring being connected rigidly to said wheel axle (10), the spring (6) between the first spring-end (15) and the center part (14) of the spring being straight, the spring (6) between said center part (14) of the spring and said second end (16) of the spring having a double-curve configuration and, seen from the side, having a downwardly convex part (19) located nearest said center part (14) and a downwardly concave part (20) located nearest said second end (16) of the spring and adjoining said downwardly convex part (19).

2. A leaf spring according to claim 1, wherein the spring (6) comprises a plurality of spring leafs (11, 12, and 13) which extend substantially parallel to one another when no load acts on the spring (6).

3. A leaf spring for the suspension of a rigid wheel axle (10) in an automotive vehicle, said leaf spring (6) being pivotally but not laterally displaceably connected at a first end (15) thereof to the vehicle and being pivotally connected at a second end (16) thereof also to said vehicle and a center part (14) of the spring being connected rigidly to said wheel axle (10), the spring (6) between the first spring-end (15) and the center part (14) of the spring being downwardly concave, the spring (6) between said center part (14) of the spring and said second end (16) of the spring having a double-curve configuration and, seen from the side, having a downwardly convex part (19) located nearest said center part (14) and a downwardly concave part (20) located nearest said second end (16) of the spring and adjoining said downwardly convex part (19).

4. A leaf spring according to claim 3, wherein the spring (6) comprises a plurality of spring leafs (11, 12, and 13) which extend substantially parallel to one another when no load acts on the spring (6).

* * * * *